Dec. 26, 1967   R. J. PURTELL   3,360,200
IRRIGATION APPARATUS HAVING DIRIGIBLE WHEELS
Filed Oct. 4, 1965   2 Sheets-Sheet 1

INVENTOR:
Rufus J. Purtell
BY:

Dec. 26, 1967   R. J. PURTELL   3,360,200
IRRIGATION APPARATUS HAVING DIRIGIBLE WHEELS
Filed Oct. 4, 1965   2 Sheets-Sheet 2

INVENTOR:
Rufus J. Purtell
BY:

United States Patent Office 3,360,200
Patented Dec. 26, 1967

1

3,360,200
IRRIGATION APPARATUS HAVING
DIRIGIBLE WHEELS
Rufus J. Purtell, Brownfield, Tex., assignor to The J. B. Knight Co., Inc., Brownfield, Tex., a corporation of Texas
Filed Oct. 4, 1965, Ser. No. 492,608
4 Claims. (Cl. 239—213)

ABSTRACT OF THE DISCLOSURE

A sprinkler irrigation vehicle is driven by a combination of shaft and gear drive. The line shaft extends parallel to the pipe and, through a double right angle drive, drives two horizontal shafts at right angles to the pipe. At each wheel, another right angle gear drive drives a vertical shaft which is aligned with vertical pivot for the wheels. Yet another right angle gear drive drives the horizontal wheel axle which may be parallel or at right angles to the pipe.

---

This invention relates to agricultural sprinkler systems and more particularly to means for moving an elevated sprinkler pipe from one position to another.

This application pertains to that particular type of sprinkler systems for agricultural purposes wherein the sprinkler pipe is supported at all times elevated above the ground by a plurality of vehicles. The general sequence of operation is that the vehicles are stationary while the water is being supplied to the pipe. After one area of a field has been watered the water flow is discontinued to the sprinkler pipe, the sprinkler pipe drained and disconnected from the source of supply, all of the vehicles advanced transversely of the pipe to a new position, the sprinkler pipe again connected to its source of supply, and water under pressure again supplied to the sprinkler pipe to water the new area (the dry area of the field adjacent to that which has just been watered).

When one boundary of the field being irrigated is reached in this sequential operation it is often desirable to move the sprinkler pipe longitudinally (a direction aligned with the axis of the sprinkler pipe).

Furthermore it is often desirable to align the wheels of the vehicle at a slight angle to the general transverse direction of the movement to accommodate for sloping land or to accommodate for endwise movement from whatever cause. One additional cause of endwise movement might be furrows which are angled to the direction of movement.

An object of this invention is to provide an argicultural irrigation system which may be moved by its own power in a plurality of different directions.

Further objects are to achieve the above with a device that is sturdy, compact, durable, simple, versatile, and reliable, yet inexpensive and easy to manufacture and operate.

The specific nature of the invention as well as other objects, uses and advantages thereof will clearly appear from the following description and from the accompanying drawing, the different views of which are not necessarily to the same scale, in which:

FIG. 1 is a perspective view of one vehicle of a system according to this invention.

2

Figure 1:
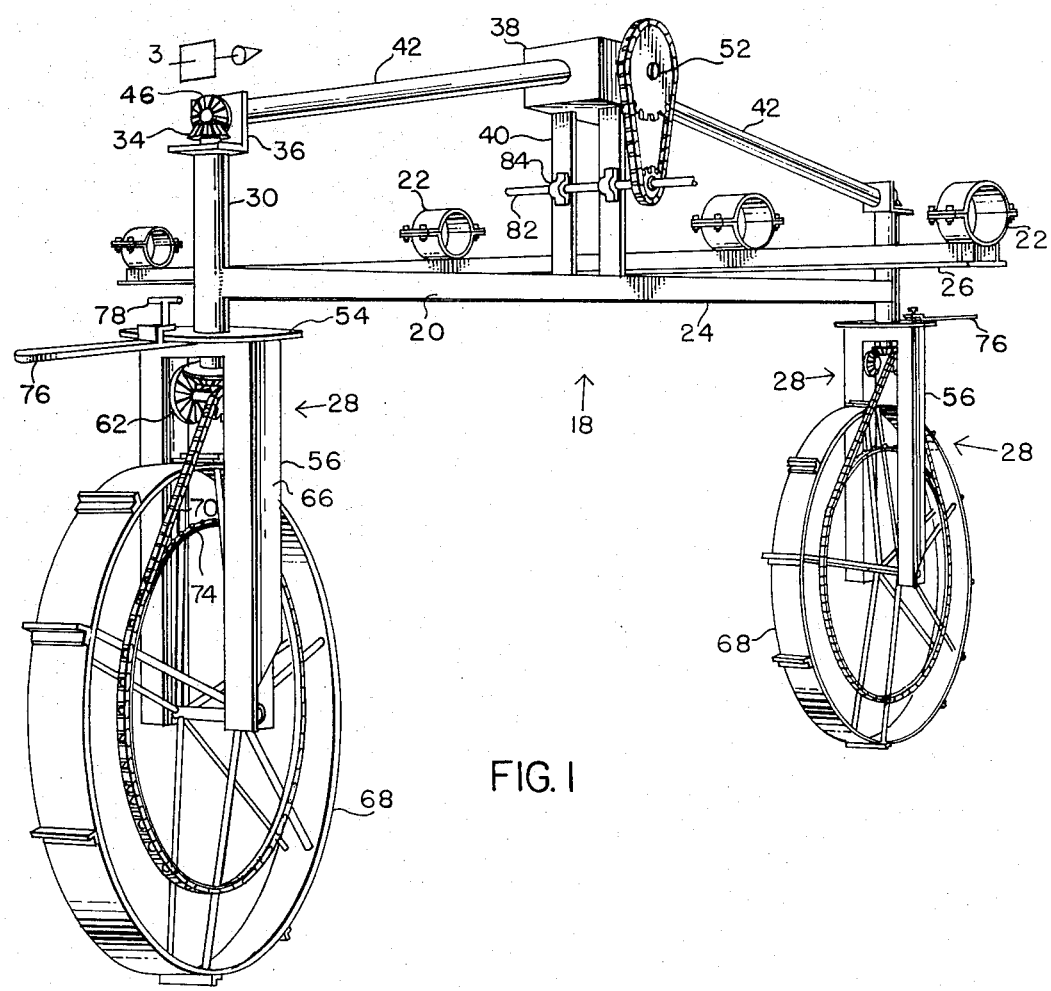
Figure 2:
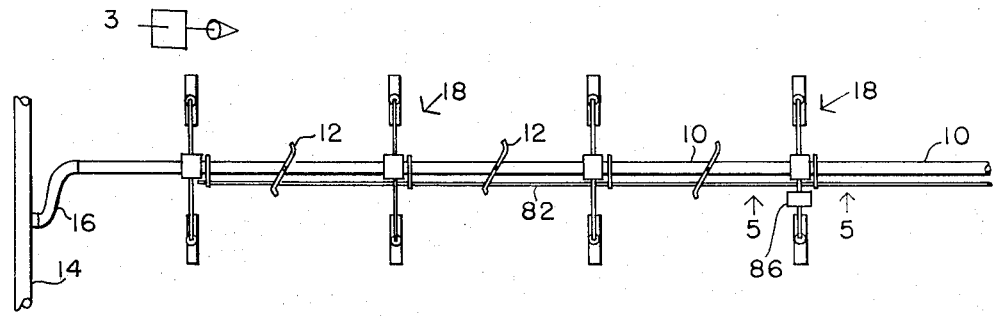
FIG. 2 is a schematic top plan view of a portion of a system according to this invention.
Figure 3:
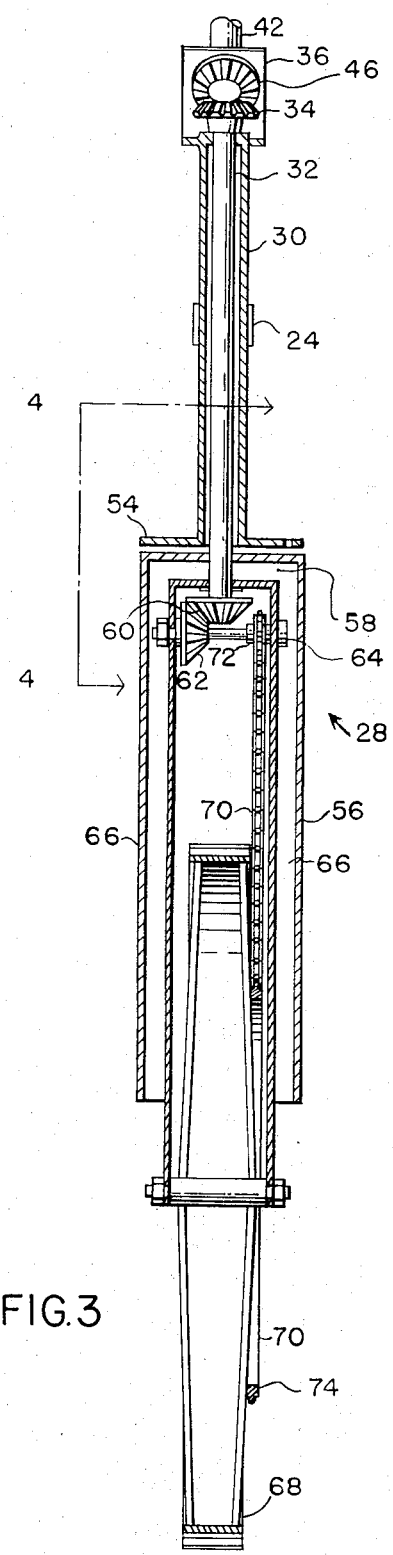
FIG. 3 is a partial sectional view of one wheel of the vehicle of FIG. 1 taken substantially along plane 3—3 of FIG. 1.

It will be noted in the drawings that FIGS. 1, 2, and 3 show the wheels of the vehicle set to move sprinkler pipe 10 transversely.

Referring more specifically to FIG. 2 sprinkler pipe 10 has a plurality of sprinklers 12 (shown schematically) connected thereto for distributing water from the sprinkler pipe onto the land to be irrigated. Main pipe 14 is a source of water under pressure to the sprinkler pipe through flexible connection 16. The sprinkler pipe 10 is movingly supported by a plurality of vehicles 18.

Each vehicle has a frame 20 (FIG. 1). A plurality of pipe clamps 22 provides means for clamping sprinkler pipe 10 to the frame of each of the vehicles 18.

The frame 20 (constructed of welded structural steel members) includes crossmember 24 which is at right angles to the member 26 upon which the clamps 22 are mounted. Therefore the crossmember 24 extends to the front and rear of the sprinkler pipe 10. Bracket 28 is mounted on either end of crossmember 24, i.e. in front of and behind the sprinkler pipe 10. A vertical tube 30 is welded on either end of the horizontal crossmember 24. Vertical bracket shaft 32 is journalled within the tube 30 (FIG. 3). Bevel gear 34 is attached to the top of shaft 32 and the hub of the bevel gear 34 bears against one leg of the L-shaped head 36 which is welded on top of the tube 30.

Figure 5:
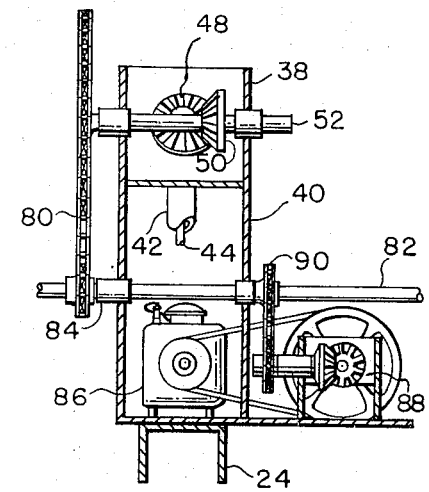
FIG. 5 is a sectional view of one vehicle taken substantially on line 5—5 of FIG. 2 illustrating a power unit.
Figure 4:
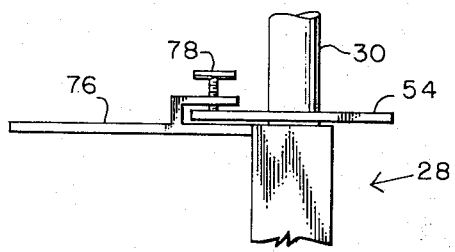
FIG. 4 is a detail of a portion of one of the brackets taken substantially along line 4—4 of FIG. 3.

Gear box 38 is attached to the frame 20 in the center thereof above the member 26. It is attached by pedestals 40 which are attached to the crossmember 24. Tube 42 is welded between the gear box 38 and the L-shaped head 36. Frame shaft 44 is journalled within the tube 42 (FIG. 5). Bevel gear 46 on the bracket end or outboard end of the shaft 44 meshes wtih bevel gear 34. Bevel gear 48 on the inboard end of the shaft 44 within gear box 38, meshes with main bevel gear 50 which is mounted upon jack shaft 52 which is journalled for rotation between two sides of the gear box 38. Although FIG. 5 shows only one bevel gear 48 it will be understood that each of the tubes 42 has a shaft 44 journalled therein and each shaft has a bevel gear 48 which is rotated by the main bevel gear 50.

Circular plate 54 is welded to the bottom of the tube 30 (FIGS. 1 and 3). Shaft 32 extends through an aligned hole in plate 54. The bracket 28 includes inverted U-shaped member 56. The bracket shaft 32 extends through an aligned hole in the bight 58 of the U-member 56. Lower bevel gear 60 (on the bottom of the bracket shaft 32) meshes with bracket bevel gear 62 which is journalled on horizontal shaft 64 which extends between the two legs 66 of the U-shaped member 56. Ground engaging wheel 68 is journalled about a horizontal axis between the lower ends of the legs 66. Chain 70 innerconnects sprocket 72 upon the shaft 64 with sprocket 74 which is attached to the spokes of the wheel 68.

The upper surface of the bight 58 bears against the lower surface of the plate 54. The bracket 28 is therefore rotatable about the same vertical axis as the axis of the bracket shaft 32. Handle 76 is attached to the top of the U-shaped member 56 to provide convenient manual means for rotating the bracket 28 about its vertical axis. Set screws 78 provide for locking the bracket in any pre-determined position.

The jack shaft 52 is rotated by chain 80 which is trained over sprockets attached to the jack shaft 52 and main line shaft 82. The line shaft is rotatably connected to the pipe 10 and extends along the pipe. The line shaft 82 is also journalled to each of the vehicles 18 by bearings 84 attached to the pedestal 40 to the frame 20.

The line shaft 82 is rotated or driven by power unit 86 which is mounted upon one of the vehicles 18. The power unit 86 is illustrated as an internal combustion engine which drives a reversing transmission 88 by a V-belt drive. Inasmuch as reversing gear drives are well known to the art it will not be described in detail here. The line shaft 82 is driven by chain 90 which innerconnects the reversing transmission 88 of power unit 86 with the line shaft 82.

In normal operation water supplied by the main pipe 14 through flexible connection 16 to the pipe 10 is sprinkled upon the ground through sprinklers 12. When it is desired to move the system, the flexible connection 16 is removed from the pipe 10. Then the single power unit 86 located upon one of the vehicles 18 is started. The system is driven forward or backward depending upon the setting of the reversing transmission 88. The power unit 86 powers the line shaft 82 which drives each of the wheels 68 of each vehicle through the gear box 38 and the right angle bevel gears. The direction of travel of the vehicles 18 may be changed by the setting of the handles 76. This may change the angle at which the wheels 68 run either a small fraction of a degree to compensate for drift to the right or left or they may be rotated 90° to cause the system to move longitudinally of the pipe 10 rather than transversely thereof.

It will be apparent that the embodiment shown is only exemplary and that various modifications can be made in construction, materials and arrangement within the scope of the invention as defined in the appended claims.

I claim as my invention:

1. In an irrigation system having
    (a) a pipe adapted to carry sprinklers thereon,
    (b) means connected to the pipe for supplying water under pressure to the pipe.
    (c) a plurality of vehicles movingly supporting the pipe,
    (d) a line shaft rotatably connected to the pipe extending along the pipe,
    (e) power means on one of the vehicles for rotating the line shaft,
    (f) each vehicle having a frame,
    (g) clamp means on the frame for clamping the pipe to the frame, and
    (h) bearing on the frame through which the line shaft is journalled;
the invention comprising in combination with the above:
    (j) at least two brackets on the frame journalled for rotation about a vertical axis,
    (k) a ground engaging wheel journalled to each bracket about a horizontal axis,
    (m) two frame shafts extending from the center of the frame to the brackets,
    (n) right angle gear means on the center of the frame for rotating the frame shafts responsive to rotation of the line shaft,
    (o) a vertical bracket shaft on each bracket mounted for rotation about an axis co-axial to the vertical axis about which the bracket is journalled,
    (p) right angle gear means at each bracket for rotating the bracket shaft responsive to rotation of the frame shaft extending to said bracket, and
    (q) means on each bracket for rotating said wheel responsive to rotation of said bracket shaft.

2. The invention as defined in claim 1 wherein said right angle gear means on the center of the frame for rotating the frame shaft includes
    (r) a jack shaft parallel to said line shaft,
    (s) sprocket chain means interconnecting said line shaft and jack shaft for rotating said jack shaft responsive to rotation of said line shaft,
    (t) a bevel gear on said jack shaft, and
    (u) a bevel gear on each of said frame shafts meshed with the bevel gear on said jack shaft.

3. In an irrigation system having
    (a) a pipe adapted to carry sprinklers thereon,
    (b) means connected to the pipe for supplying water under pressure to the pipe,
    (c) a plurality of vehicles movingly supporting the pipe,
    (d) a line shaft rotatably connected to the pipe extending along the pipe,
    (e) power means on one of the vehicles for rotating the line shaft,
    (f) each vehicle having a frame,
    (g) clamp means on the frame for clamping the pipe to the frame, and
    (h) bearing on the frame through which the line shaft is journalled;
the invention comprising in combination with the above:
    (j) at least two brackets on the frame journalled for rotation about a vertical axis,
    (k) a ground engaging wheel journalled to each bracket about a horizontal axis,
    (m) two frame shafts extending to the brackets,
    (n) right angle bevel gears on the frame shafts for rotating the frame shafts,
    (o) means on the frame for rotating said right angle bevel gears responsive to the rotation of the line shaft,
    (p) a vertical bracket shaft on each bracket mounted for rotation about an axis co-axial to the vertical axis about which the bracket is journalled,
    (q) right angle gear means at each bracket for rotating the bracket shaft responsive to rotation of the frame shaft extending to said bracket, and
    (r) means on each bracket for rotating said wheel responsive to rotation of said bracket shaft.

4. In an irrigation system having
    (a) a pipe adapted to carry sprinklers thereon,
    (b) means connected to the pipe for supplying water under pressure to the pipe,
    (c) a plurality of vehicles movingly supporting the pipe,
    (d) a line shaft rotatably connected to the pipe extending along the pipe,
    (e) power means on one of the vehicles for rotating the line shaft,
    (f) each vehicle having a frame,
    (g) clamp means on the frame for clamping the pipe to the frame, and
    (h) bearing on the frame through which the line shaft is journalled;
the invention comprising in combination with the above:
    (j) at least two brackets on the frame journalled for rotation about a vertical axis,
    (k) a ground engaging wheel journalled to each bracket about a horizontal axis,
    (m) two frame shafts extending from the center of the frame to the brackets,
    (n) right angle gear means on the center of the frame for rotating the frame shafts responsive to rotation of the line shaft, and
    (o) means on each bracket for rotating said wheel responsive to rotation of said frame shaft regardless of the rotational position of said bracket on said frame.

References Cited
UNITED STATES PATENTS

| | | | |
|---|---|---|---|
| 1,107,990 | 8/1914 | Pamer | 180—31 X |
| 1,226,200 | 5/1917 | Eversole | 239—213 X |
| 3,147,764 | 9/1964 | Jensen | 239—212 X |
| 3,202,361 | 8/1965 | Kane | 239—212 |
| 3,211,382 | 10/1965 | Cornelius et al. | 239—212 |
| 3,230,969 | 1/1966 | Purtell | 239—212 X |
| 3,245,595 | 4/1966 | Purtell | 239—212 X |
| 3,245,608 | 4/1966 | Purtell | 239—212 X |
| 3,268,025 | 8/1966 | Fehn | 180—31 |

FOREIGN PATENTS 1,026,020   1/1953   France.

M. HENSON WOOD, Jr., *Primary Examiner.*

VAN C. WILKS, *Examiner.*